United States Patent [19]

Murata et al.

[11] Patent Number: 4,960,743

[45] Date of Patent: * Oct. 2, 1990

[54] METHOD FOR PRODUCTION OF CATALYST CARRIER FOR POLYMERIZATION OF OLEFIN

[75] Inventors: Masahide Murata; Masafumi Imai; Hiroyuki Furuhashi; Kouji Maruyama; Hiroshi Ueno, all of Saitama, Japan

[73] Assignee: Toa Nenryo Kogyo KK, Tokyo, Japan

[*] Notice: The portion of the term of this patent subsequent to Mar. 21, 2006 has been disclaimed.

[21] Appl. No.: 273,397

[22] Filed: Nov. 18, 1988

[30] Foreign Application Priority Data

Nov. 30, 1987 [JP] Japan .................. 62-300073

[51] Int. Cl.$^5$ .................................. C08F 4/64
[52] U.S. Cl. .................................. 502/121; 502/111; 502/115; 502/116; 502/125; 526/124
[58] Field of Search .............. 502/111, 121, 125, 115, 502/116

[56] References Cited

U.S. PATENT DOCUMENTS

| | | | |
|---|---|---|---|
| 3,953,414 | 4/1976 | Galli et al. | 252/429 C X |
| 4,111,835 | 2/1982 | Foschini et al. | 252/429 C X |
| 4,220,554 | 9/1980 | Scata et al. | 502/125 X |
| 4,311,817 | 1/1982 | Morita et al. | 526/124 |
| 4,315,835 | 2/1982 | Scata et al. | 502/125 X |
| 4,370,257 | 1/1983 | Imai et al. | 502/125 X |
| 4,814,311 | 3/1989 | Murata et al. | 502/125 X |
| 4,814,313 | 3/1989 | Murata et al. | 502/125 X |

FOREIGN PATENT DOCUMENTS 0137694 6/1976 Japan .

*Primary Examiner*—Patrick P. Garvin
*Attorney, Agent, or Firm*—M. B. Kurtzman; M. E. Wilson

[57] ABSTRACT

A method for the production of a catalyst carrier for use in the polymerization of an olefin, which method comprises causing a magnesium-containing solid obtained by contact of (A) magnesium metal, (B) a halogenated hydrocarbon represented by the general formula, RX [wherein R stands for an alkyl, aryl, or cycloalkyl group having 1 to 20 carbon atoms and X stands for a halogen atom], and (C) a compound of the general formula, $X_n^1 M(OR^1)_{m-n}$ [wherein $X^1$ stands for a hydrogen atom, a halogen atom, or a hydrocarbon group having 1 to 20 carbon atoms, M stands for a boron, carbon, aluminum, silicon, or phosphorus atom, $R^1$ stands for a hydrocarbon group having 1 to 20 carbon atoms, and m stands for the valency of said atom M, providing that $m > n \geq 0$ is satisfied], to contact (D) a halogen-containing alcohol.

5 Claims, No Drawings

METHOD FOR PRODUCTION OF CATALYST CARRIER FOR POLYMERIZATION OF OLEFIN

DESCRIPTION OF THE INVENTION

1. Field of the Invention

This invention relates to a method for the production of a catalyst carrier for use in the polymerization of an olefin, the titanium-containing catalyst component produced and the method of polymerizing olefins in the presence of the catalyst component.

2. Description of the Prior Art

A magnesium-carried (supported) catalyst having a transition metal component such as titanium deposited on a magnesium compound-containing carrier and intended for use in the polymerization of an olefin has been known to the art. More often than not in the preparation of the catalyst, the carrier therefore is used after it has been mechanically pulverized. In this case, the produced catalyst for polymerization and consequently the polymer obtained therewith consist of particles which are devoid of uniformity in shape.

Recently, a few attempts are being made to improve the shape of particles of a carrier. For example, a method which comprises converting an aqueous magnesium chloride solution or dissolved magnesium chloride hydrate ($MgCl_2 \cdot 6H_2O$) through spray drying into spherical particles U.S. Pat. Nos. 3,953,414, 4,111,835, and 4,311,817, a method which comprises mutually contacting magnesium metal, a halogenated hydrocarbon, and an electron donor type compound such as an alcohol (Japanese Patent Application Disclosure SHO No. 51(1976)-64,586), a method which comprises causing an organic magnesium compound to react with an ester of orthosilicic acid, and a method which comprises causing mutual reaction of an ester of orthosilicic acid and a halogenated hydrocarbon U.S. Pat. Nos. 4,220,554 and 4,315,825 have been proposed. Indeed these methods are capable of improving the shapes of particles of a carrier and a catalyst to some extent. The catalysts produced, however, are not satisfactory in terms of activity.

The present inventors formerly found that a magnesium-containing solid consisting of particles uniform in shape and effectively serving as a carrier for an olefin polymerization catalyst is obtained by causing contact of magnesium metal, a halogenated hydrocarbon, and a compound of the general formula $X_m C(OR)_{4-m}$ U.S. Pat. No. 4,370,257. The catalyst prepared by using this solid, however, has an unsolved problem concerning the activity for polymerization.

Problem for Solution by the Invention

An object of this invention is to provide a catalyst carrier for the polymerization of an olefin, excelling in the quality of particles and exhibiting efficiency in polymerization on a practical level.

Invention for Solution of the Problem

After a diligent study, the present inventors have found that the object of this invention can be accomplished by providing a magnesium-containing solid produced by contact of the magnesium-containing solid disclosed in U.S. Pat. Nos. 4,370,257 and 4,220,554 mentioned above with a halogen-containing alcohol. The present invention has been perfected as the result.

SUMMARY OF THE INVENTION

To be specific, the essence of the present invention resides in a method for the production of a catalyst carrier for use in the polymerization of an olefin, which method comprises causing a magnesium-containing solid obtained by contact of (A) magnesium metal, (B) a halogenated hydrocarbon represented by the general formula, RX [wherein R stands for an alkyl, aryl, or cycloalkyl group having 1 to 20 carbon atoms and X stands for a halogen atom], and (C) a compound of the general formula, $X^1_n M(OR^1)_{m-n}$ [wherein $X^1$ stands for a hydrogen atom, a halogen atom, or a hydrocarbon group having 1 to 20 carbon atoms, M stands for a boron, carbon, aluminum, silicon, or phosphorus atom, $R^1$ stands for a hydrocarbon group having 1 to 20 carbon atoms, and m stands for the valency of said atom M, providing that $m < n \geq 0$ is satisfied], to contact (D) a halogen-containing alcohol.

Raw Materials for Preparation of Carrier

(A) Magnesium metal

Though this invention does not discriminate magnesium metal on account of its form, magnesium metal is used particularly advantageously herein in the form of powder or chips. Preparatorily to actual use, the magnesium metal is desirably washed with an inactive hydrocarbon such as, for example, a saturated aliphatic, alicyclic, or aromatic hydrocarbon having 6 to 8 carbon atoms and then dried by heating in the presence of an inactive gas such as nitrogen.

(B) Halogenated hydrocarbon

Of the halogenated hydrocarbons represented by the general formula, RX, particularly desirable are chlorinated or brominated hydrocarbons containing as the substituent, R, an alkyl, aryl, or cycloalkyl group having 1 to 8 carbon atoms. To be concrete, such particularly desirable halogenated hydrocarbons include methyl, ethyl, isopropyl, n-butyl, n-octyl, and cyclohexyl chlorides and bromides, chlorobenzene, and o-chlorotoluene, for example.

(C) Compound of general formula $X^1_n M(OR^1)_{m-n}$

In the formula, the symbols M, $X^1$, $R^1$, m, and n have the same meanings as defined above. The substituent, $X^1$, may be a halogen-substituted hydrocarbon having 1 to 20 carbon atoms. Where $X^1$ is a hydrocarbon group, $X^1$ and $R^1$ may be same or different. Hereinafter, the compounds of the aforementioned general formula will be referred to simply as "alkoxy compounds".

As examples of the hydrocarbon group, there can be cited alkyl groups such as methyl, ethyl, propyl, i-propyl, butyl, amyl, hexyl, octyl, 2-ethylhexyl, and decyl; cycloalkyl groups such as cyclopentyl, cyclohexyl, and methylcyclohexyl; alkenyl groups such as allyl, propenyl, and butynyl; aryl groups such as phenyl, tolyl, and xylyl; and aralkyl groups such as phenetyl and 3-phenylpropyl. Among other hydrocarbon groups enumerated above, alkyl groups of 1 to 10 carbon atoms prove to be particularly advantageous. Now, concrete examples of the alkoxy compounds will be cited below.

(1) Compounds using a carbon atom as the substituent, M

The compounds of the formula, $C(OR^1)_4$, including $C(OCH_3)_4$, $C(OC_2H_5)_4$, $C(OC_3H_7)_4$, $C(OC_4H_9)_4$, $C(O-i-C_4H_9)_4$, $C(OC_6H_{13})_4$, and $C(OH_8H_{17})_4$; the compounds of the formula, $X^1C(OR^1)_3$, including $HC(OCH_3)_3$, $HC(OC_2H_5)_3$, $HC(OC_3H_7)_3$, $HC(OC_4H_9)_3$, $HC(O-i-C_4H_9)_3$, $HC(OC_6H_{13})_3$, $HC(OC_8H_{17})_3$, $HC(OC_6H_5)_3$; $CH_3C(OCH_3)$, $CH_3C(OC_2H_5)_3$, $C_2H_5C(OCH_3)_3$, $C_2H_5C(OC_2H_5)_3$, $C_6H_{11}C(OC_2H_5)_3$, $C_6H_5C(OCH_3)_3$, $C_6H_5C(OC_2H_5)_3$, $C_6H_5C(OC_3H_7)_3$, $C_7H_7C(OC_2H_5)_3$, $C_8H_9C(OC_2H_5)_3$; $CH_2BrC(OC_2H_5)_3$, $CH_2ClC(OC_2H_5)_3$, $CH_3CHBrC(OC_2H_5)_3$, $CH_3CHClC(OC_2H_5)_3$; $ClC(OCH_3)_3$, $ClC(OC_2H_5)_3$, $ClC(OC_3H_7)_3$, $ClC(O-i-C_4H_9)_3$, $ClC(OC_8H_{17})_3$, $ClC(OC_6H_5)_3$, and $BrC(OC_2H_5)_3$; and the compounds of the formula, $X_2^1C(OR^1)_2$, including $CH_3CH(OCH_3)_2$, $CH_3CH(OC_2H_5)_2$, $CH_2(OCH_3)_2$, $CH_2(OC_2H_5)_2$, $CH_2ClCH(OC_2H_5)_2$, $CHCl_2CH(OC_2H_5)_2$, $CCl_3CH(OC_2H_5)_2$, $CH_2BrCH(OC_2H_5)_2$, $CH_2ICH(OC_2H_5)_2$, and $C_6H_5CH(OC_2H_5)_2$.

(2) Compounds using a silicon atom as the substituent, M

The compounds of the formula, $Si(OR^1)_4$, including $Si(OCH_3)_4$, $Si(OC_2H_5)_4$, $Si(OC_4H_9)_4$, $Si(O-i-C_4H_9)_4$, $Si(OC_6H_{13})_4$, $Si(OC_8H_{17})_4$, $Si[O.CH_2CH(C_2H_5)C_4H_9]_4$, and $Si(OC_6H_5)_4$; the compounds of the formula, $RSi(OR^1)_3$, including $HSi(OC_2H_5)_3$, $HSi(OC_4H_9)_3$, $HSi(OC_6H_{13})_3$, $HSi(OC_6H_5)_3$, $CH_3Si(OCH_3)_3$, $CH_3Si(OC_2H_5)_3$, $CH_3Si(OC_4H_9)_3$, $C_2H_5Si(OC_2H_5)_3$, $C_4H_9Si(OC_2H_5)_3$, $C_6H_5Si(OC_2H_5)_3$, $C_2H_5Si(OC_6H_5)_3$, $ClSi(OCH_3)_3$, $ClSi(OC_2H_5)_3$; $ClSi(OC_3H_7)_3$, $ClSi(OC_6H_5)_3$, and $BrSi(OC_2H_5)_3$; the compounds of the formula, $R_2Si(OR^1)_2$, including $(CH_3)_2Si(OCH_3)_2$, $(CH_3)_2Si(OC_3H_7)_2$, $(C_2H_5)_2Si(OC_2H_5)_2$, $(C_6H_5)_2Si(OC_2H_5)_2$, $CH_3ClSi(OC_2H_5)_2$, $CHCl_2SiH(OC_2H_5)_2$, $CCl_3SiH(OC_2H_5)_2$, $CH_3BrSi(OC_2H_5)_2$, and $CH_3ISi(OC_2H_5)_2$; and the compounds of the formula, $R_3SiOR^1$, including $(CH_3)_3SiOCH_3$, $(CH_3)_3SiOC_2H_5$, $(CH_3)_3SiOC_4H_9$, $(CH_3)_3SiOC_6H_5$, $(C_2H_5)_3SiOC_2H_5$, and $(C_6H_5)_3SiOC_2H_5$.

(3) Compounds using a boron atom as the substituent, M

The compounds of the formula, $B(OR^1)_3$, including $B(OC_2H_5)_3$, $B(OC_4H_9)_3$, $B(OC_6H_{13})_3$, and $B(OC_6H_5)_3$.

(4) Compounds using an aluminum atom as the substituent, M

The compounds of the formula, $Al(OR^1)_3$, including $Al(OCH_3)_3$, $Al(OC_2H_5)_3$, $Al(OC_3H_7)_3$, $Al(O-i-C_3H_7)_3$, $Al(OC_4H_9)_3$, $Al(O-t-C_4H_9)_3$, $Al(OC_6H_{13})_3$, and $Al(OC_6H_5)_3$.

(5) Compounds using a phosphorus atom as the substituent, M

The compounds of the formula, $P(OR^1)_3$, including $P(OCH_3)_3$, $P(OC_2H_5)_3$, $P(OC_4H_9)_3$, $P(OC_6H_{13})_3$, and $P(OC_6H_5)_3$.

(D) Halogen-containing alcohol

The term "halogen-containing alcohol" as used in the present invention means a compound obtained from a monohydric or polyhydric alcohol possessing one or more hydroxyl groups in the molecular unit thereof by substituting a halogen atom for at least one freely selected hydrogen atom other than the hydrogen atom of the hydroxyl group. As examples of the halogen atom, there can be cited chlorine, bromine, iodine, and fluorine atoms. Among other halogen atoms cited above, the chlorine atom proves to be particularly advantageous.

As examples of the compound of the foregoing definition, there can be cited 2-chloroethanol, 1-chloro-2-propanol, 3-chloro-1-propanol, 1-chloro-2-methyl-2-propanol, 4-chloro-1-butanol, 5-chloro-1-pentanol, 6-chloro-1-hexanol, 3-chloro-1,2-propane diol, 2-chlorocyclohexanol, 4-chlorobenzhydrol, (m,o,p)-chlorobenzyl alcohol, 4-chlorocatechol, 4-chloro-(m,o)-cresol, 6-chloro-(m,o)-cresol, 4-chloro-3,5-dimethyl phenol, chlorohydroquinone, 2-benzyl-4-chlorophenol, 4-chloro-1-naphthol, (m,o,p)-chlorophenol, p-chloro-α-methylbenzyl alcohol, 2-chloro-4-phenyl phenol, 6-chlorothymol, 4-chlororesorcinol, 2-bromoethanol, 3-bromo-1-propanol, 1-bromo-2-propanol, 1-bromo-2-butanol 2-bromo-p-cresol, 1-bromo-2-naphthol, 6-bromo-2-naphthol, (m,o,p)-bromophenol, 4-bromoresorcinol, (m,o,p)-fluorophenol, p-iodophenol; 2,2-dichloroethanol, 2,3-dichloro-1-propanol, 1,3-dichloro-2-propanol, 3-chloro-1-(α-chloromethyl)-1-propanol, 2,3-dibromo-1-propanol, 1,3-dibromo-2-propanol, 2,4-dibromoophenol, 2,4-dibromo-1-naphthol; 2,2,2-trichloroethanol, 1,1,1-trichloro-2-propanol, β, β, β-trichloro-tert-butanol, 2,3,4-trichlorophenol, 2.4,5-trichlorophenol, 2,4,6-trichlorophenol, 2,4,6-tribromophenol, 2,3,5-tribromo-2-hydroxy toluene, 2,3,5-tribromo-4-hydroxy toluene, 2,2,2-trifluoroethanol, α, α, α-trifluoro-m-cresol, 2,4,6-triiodophenol; 2,3,4,6-tetrachlorophenol, tetrachlorohydroquinone, tetrachloro-bis-phenol A, tetrabromo-bis-phenol A, 2,2,3,3-tetrafluoro-1-propanol, 2,3,5,6-tetrafluorophenol, and tetrafluororesorcinol.

Procedure for Preparation of Catalyst Component

The carrier mentioned above is obtained by causing halogen-containing alcohol to come into contact with the product of contact of magnesium metal, a halogenated hydrocarbon, and an alkoxy compound.

(1) Contact among magnesium, halogenated hydrocarbon, and alkoxy compound

The method for establishing contact among the three components is not specifically limited. Virtually any method can be adopted for this contact. This contact can be accomplished, for example, by (1) a method which comprises simultaneously placing the three components into mutual contact, (2) a method which comprises preparatorily allowing magnesium metal to come into contact with the halogenated hydrocarbon and subsequently allowing the product of this contact or a compound obtained in advance by the contact of the two components, such as, for example, any of the compounds represented by the formulas, $ClMgCH_3$, $ClMgC_2H_5$, $ClMgC_3H_7$, $ClMgC_4H_9$, $ClMg-i-C_4H_9$, $ClMgC_6H_{13}$, $ClMgC_8H_{17}$, $BrMgC_2H_5$, $BrMgC_4H_9$, $BrMg-i-C_4H_9$, $ImgC_4H_9$, $ClMgC_6H_5$, and $BrMgC_6H_5$, which are known as Grignard reagents, to come into contact with the alkoxy compound, (3) a method which comprises suspending magnesium metal in a solution of the alkoxy compound and adding a solution of the halogenated hydrocarbon to the resultant suspension, or (4) a method which comprises placing the alkoxy compound and the halogenated hydrocarbon into mutual contact and subsequently adding magnesium metal to the product of the contact, for example.

It is also possible that the contacting of the three components mentioned above may be accomplished in the presence of a small amount of Grignard reagent in the reaction system.

The ratio of the amounts of the alkoxy compound and magnesium metal to be used is desired to be such that the number of $OR^1$ groups in the alkoxy compound per magnesium atom in the magnesium metal exceeds 1, or preferably falls in the range of 3 to 5. In the case of an alkoxy compound represented by the formula, $X_2^1C(OR^1)_2$, for example, the amount of the alkoxy compound is desired to exceed 0.5 mol, or preferably falls in the range of 1.5 to 2.5 mols, per gram atom of magnesium. In the case of an alkoxy compound represented by the formula, $X^1C(OR^1)_3$, the amount of the alkoxy compound is desired to exceed $\frac{1}{3}$ mol, or preferably fall- in the range of 1 to 5/3 mols, per gram atom of magnesium. The amount of the halogenated hydrocarbon to be used is desired to fall in the range of 1 to 2 mols. per gram atom of magnesium.

The contact reaction of the foregoing description is accomplished by stirring the combined components under such conditions that the contact temperature falls in the range of 0° C. to 250° C., preferably 30° C. to 120° C., and the contact time falls in the range of 0.5 to 10 hours. This reaction may be carried out, where desired, in the presence of the same inactive hydrocarbon such as, for example, an aliphatic, alicyclic, or aromatic hydrocarbon having 6 to 8 carbon atoms, as used in the drying of magnesium metal. The reaction should preferably be performed in the presence of an ether to increase the reaction efficiency. Examples of the ether that can be used include diethyl ether, diisopropyl ether, dibutyl ether, diisobutyl ether, diisoamyl ether, di-2-ethylhexyl ether, diallyl ether, diphenyl ether, and anisole.

It is permissible, for the purpose of promoting this reaction, to use iodine, an alkyl iodide, or an inorganic halide such as calcium chloride, copper chloride, manganese chloride, or a hydrogen halogenide.

The solid product prepared by the reaction described above is subsequently brought into contact with a halogen-containing alcohol. This contact may be accomplished by simply adding the alcohol to the reaction system in which the previous reaction has been performed. Alternatively, prior to the contact with the alcohol, the solid product may be removed from the reaction system and cleaned with a suitable cleaning agent such as the aforementioned inactive hydrocarbon. The cleaned product may be dried according to need.

(2) Contact with halogen-containing alcohol

The magnesium-containing solid obtained in (1) is brought into contact with a halogen-containing alcohol. This contact may be accomplished by mixing and stirring the two components in the presence of an inactive medium. Examples of the inactive medium include hydrocarbons such as pentane, hexane, heptane, octane, decane, cyclohexane, benzene, toluene, and xylene; and halogenated hydrocarbons such as 1,2-dichloroethane, 1,2-dichloropropane, carbon tetrachloride, butyl chloride, isoamyl chloride, bromobenzene, and chlorotoluene.

The contact of the two components is usually carried out at a temperature in the range of $-20°$ C. to $+150°$ C. for a period in the range of 0.1 to 100 hours. Where the contacting evolves heat, the following procedure may be employed. At first, the two components are slowly brought into contact with each other at a low temperature. After the two components have been entirely mixed with each other, the temperature is raised, and the two components are kept in contact with each other at the raised temperature.

The amount of the halogen-containing alcohol to be used is generally in the range of 0.05 to 20 gram mols, preferably 0.1 to 10 gram mols per gram atom of magnesium in the solid.

The catalyst carrier according to the present invention is obtained as described above. This carrier, when necessary, may be washed with an inactive hydrocarbon and, when further necessary, dried.

The carrier of the present invention consists of particles which have a narrow particle size distribution and high uniformity in shape. The specific surface area of the carrier particles as measured by the BET method at the adsorption temperature of liquefied nitrogen is less than 1000 $m^2/g$, preferably 30 to 600 $m^2/g$, the pore volume is less than 1.00 $cm^3/g$, preferably 0.03 to 0.7 $cm^3/g$. As to the percentage composition, this carrier is made up of 5 to 25% by weight of magnesium atom, 3 to 70% by weight of a halogen atom, and the balance to make up 100% by weight of organic compound and others.

As solid catalyst to be obtained by depositing on this carrier any of such transition metals as titanium, vanadium, and zirconium, which have been heretofore known as catalytic components for the polymerization of olefins, manifests a highly desirable efficiency for catalysis. In the preparation of a catalyst by the use of this solid, there can be used a metal oxide such as silica or alumina or an inactive solid substance such as polyethylene, polypropylene, or some other polyolefin.

Effect of the Invention

The carrier according to the present invention consists of particles of highly satisfactory quality. The catalyst for the polymerization of an olefin prepared by using this carrier and consequently the polymer produced with this catalyst both enJoy uniformity of shape of their component particles. Thus, the catalyst manifests a high activity in the production of the polymer.

Example

Now, the present invention will be described more specifically below with reference to examples and applied examples. Wherever the term "percent (%)" is used in these examples, it shall be construed as meaning a percent by weight unless otherwise specified.

The particle size distribution of the catalyst carrier was determined by measuring the particle size distribution of a sample with a particle sizer, a product of Malvern Corp. marketed under trademark designation of "MALVERN 3600", and carrying out a calculation of the following formula using the results of the measurement.

$$PSDI = \log(A/B)$$

where A is the particle diameter of particles accounting for 90% of the cumulative weight, and B is the particle diameter of particles accounting for 10% of the cumulative weight.

The melt index (MI) of the polymer was determined by the method defined in ASTM D123B. The bulk density thereof was determined by Method A defined in ASTM D1895-69.

The particle distribution of the polymer was measured with the standard sieve specified by W.S. Tyler Corp. The PSDI value consequently found was reported as the index of the particle size distribution.

| Diameter (μm) | Less than 1.9 | 1.9~ 6.4 | 6.4~ 8.2 | 8.2~ 10.5 | 10.5~ 13.6 | 13.6~ 17.7 | 17.7~ 23.7 | 23.7~ 33.7 | 33.7~ 54.9 | Above 54.9 |
|---|---|---|---|---|---|---|---|---|---|---|
| Cumulative (%) | 0.0 | 1.3 | 8.2 | 4.0 | 4.3 | 10.9 | 57.9 | 95.4 | 99.9 | 100 |

EXAMPLE 1

Preparation of magnesium-containing solid

In a reaction vessel provided with a reflux condenser and having an inner volume of 1 liter. 12.8 g (0.53 mol) of magnesium metal chips (purity 99.5% and average particle diameter 1.6 mm) and 250 ml of n-hexane were placed under atmosphere of nitrogen gas and stirred at 68° C. for 1 hour. Then, the magnesium metal was taken out of the resultant mixture and dried at 65° C. under a vacuum to obtain preactivated magnesium metal.

Subsequently, a suspension obtained by adding to the magnesium metal 88 ml (0.53 mol) of ethyl ortho-formate [$HC(OC_2H_5)_3$] and 0.5 ml of a methyl iodide solution of 10% of iodine as a promotor was held at 55° C. The suspension and a 5-ml portion of a solution of 80 ml (0.8 mol) of n-butyl chloride in 100 ml of n-hexane added dropwise thereto were stirred for 50 minutes. Then, the remainder of the aforementioned solution was added dropwise thereto over a period of 80 minutes. The resultant combined liquid was stirred at 70° C. for 4 hours to undergo a reaction. Consequently, there was obtained a solid reaction product.

This reaction product was washed six times each with 300 ml of n-hexane at 50° C. and dried under a vacuum at 60° C. for 1 hour, to recover 55.6 g of white powdery magnesium-containing solid. The solid was found to contain 22.5% of magnesium and 34.0% of chlorine.

Contact with 2,2,2-trichloroethanol

In a reaction vessel provided with a reflux condenser, a stirrer, and a dropping funnel and having an inner volume of 300 ml, 6.3 g of the magnesium-containing solid and 50 ml of n-heptane were placed under an atmosphere of nitrogen gas to form a suspension. This suspension was kept stirred at room temperature and a mixed solution of 2.0 ml (0.02 mmol) of 2,2,2-trichloroethanol and 11 ml of n-heptane was added to the suspension through the dropping funnel over a period of 30 minutes. The resultant combined liquid was stirred at 80° C. for one hour. The solid consequently formed in the stirred liquid was separated by filtration, washed six times each with 100 ml of n-hexane at room temperature and dried at room temperature for 1 hour, to produce 8.1 g of a carrier according to the present invention. This carrier was found to contain 14.2% of magnesium and 47.5% of chlorine and possesses a specific surface area of 162 m²/g and a pore volume of 0.21 cm³/g. The particle size distribution of the carrier was as shown below.

| Diameter (μm) | Less than 1.9 | 1.9~ 6.4 | 6.4~ 8.2 | 8.2~ 10.5 | 10.5~ 13.6 | 13.6~ 17.7 | 17.7~ 23.7 | 23.7~ 33.7 | 33.7~ 54.9 | Above 54.9 |
|---|---|---|---|---|---|---|---|---|---|---|
| Cumulative (%) | 0.0 | 1.3 | 8.2 | 4.0 | 4.3 | 10.9 | 57.9 | 95.4 | 99.9 | 100 |

The PSDI value of the carrier was 0.31 and the average particle diameter thereof was 23 μm.

EXAMPLE 2

Preparation of magnesium-containing solid

By following the procedure of Example 1, 8.3 g of magnesium metal was activated. Then, a suspension obtained by adding to the magnesium metal 140 ml of n-butyl ether and 0.5 ml of methyl iodide solution of 10% of iodine was kept at 55° C. To the suspension, a solution of 38.5 ml of n-butyl chloride in 50 ml of n-butyl ether was added dropwise over a period of 50 minutes. The resultant combined liquid was stirred at 70° C. for 4 hours to undergo a reaction. The reaction solution was kept at 55° C.

Then, 55.7 ml of $HC(OC_2H_5)_3$ was added dropwise to the reaction solution over a period of 1 hour. At this time, a solid was observed to form therein. After the dropwise addition was completed, the reaction mixture was left reacting at 60° C. for 15 minutes. The solid resulting from the reaction was washed six times each with 300 ml of n-hexane and dried under a vacuum at room temperature for 1 hour, to recover 31.6 g of a magnesium-containing solid having a magnesium content of 19.0% and a chlorine content of 28.9%.

Contact with 2,2,2-trichloroethanol

The procedure of Example 1 was repeated, excepting 6.3 g of the magnesium-containing solid obtained as described above was used instead. Consequently, there was obtained 8.0 of a carrier according to the present invention. This carrier was found to contain 14.3% of magnesium and 47.7% of chlorine and possesses a specific surface area of 149 m²/g and a pore volume of 0.18 cm³/g. The particle size distribution of the carrier was as shown below.

| Diameter (μm) | Less than 1.9 | 1.9~ 6.4 | 6.4~ 8.2 | 8.2~ 10.5 | 10.5~ 13.6 | 13.6~ 17.7 | 17.7~ 23.7 | 23.7~ 33.7 | 33.7~ 54.9 | Above 54.9 |
|---|---|---|---|---|---|---|---|---|---|---|
| Cumulative (%) | 0.0 | 1.5 | 2.8 | 4.0 | 7.2 | 16.3 | 38.5 | 65.4 | 93.6 | 100 |

The PSDI value of this carrier was 0.32 and the average particle diameter thereof was 22 μm.

EXAMPLES 3 THROUGH 8

Catalyst carriers according to the present invention and possessing the compositions and physical properties indicated below were obtained by following the procedure of Example 1, excepting the alkoxy compounds indicated below were used in the place of $HC(OC_2H_5)_3$.

| Example No. | Alkoxy compound | Mg content (%) | Cl content (%) | Specific surface area (m²/g) | PSDI | Ave. particle diameter (μm) | Pore volume (cm³/g) |
| --- | --- | --- | --- | --- | --- | --- | --- |
| 3 | CH$_3$CH(OC$_2$H$_5$)$_2$ | 14.5 | 47.8 | 68 | 0.38 | 29 | 0.09 |
| 4 | C(OC$_2$H$_5$)$_4$ | 14.0 | 55.3 | 94 | 0.45 | 17 | 0.12 |
| 5 | Si(OC$_2$H$_5$)$_4$ | 14.3 | 49.9 | 138 | 0.32 | 7 | 0.15 |
| 6 | Al(OC$_2$H$_5$)$_3$ | 14.4 | 48.9 | 121 | 0.40 | 13 | 0.15 |
| 7 | B(OC$_2$H$_5$)$_3$ | 13.9 | 50.2 | 79 | 0.37 | 18 | 0.10 |
| 8 | P(OC$_2$H$_5$)$_3$ | 14.1 | 46.3 | 106 | 0.36 | 17 | 0.12 |

EXAMPLES 9 THROUGH 12

Catalyst carriers according to the present invention and possessing the compositions and physical properties indicated below were obtained by following the procedure of Example 1, excepting the halogen-containing alcohols indicated below were used in the place of 2,2,2-trichloroethanol.

| Example No. | Halogen-containing alcohol | Mg content (%) | Halogen content (%) | Specific surface area (m²/g) | PSDI | Ave. particle diameter (μm) | Pore volume (cm³/g) |
| --- | --- | --- | --- | --- | --- | --- | --- |
| 9 | 1,1,1-trichloro-2-propanol | 19.2 | 42.9 | 141 | 0.39 | 27 | 0.15 |
| 10 | 2,2-dichloro-ethanol | 18.0 | 45.3 | 131 | 0.45 | 21 | 0.14 |
| 11 | p-chloro-phenol | 19.6 | 24.0 | 101 | 0.41 | 24 | 0.11 |
| 12 | 1-bromo-2-butanol | 19.4 | 43.1 | 113 | 0.50 | 26 | 0.18 |

EXAMPLES 13 THROUGH 15

Catalyst carriers according to the present invention and possessing the compositions and physical properties indicated below were obtained by following the procedure of Example 1, excepting the amount of 2,2-trichloroethanol (TCE) to be used was varied as shown below.

| Example No. | Amount of TCE used (ml) | Mg content (%) | Cl content (%) | Specific surface area (m²/g) | PSDI | Ave. particle diameter (μm) | Pore volume (cm³/g) |
| --- | --- | --- | --- | --- | --- | --- | --- |
| 13 | 1 | 11.7 | 40.1 | 153 | 0.38 | 23 | 0.20 |
| 14 | 4 | 15.2 | 58.1 | 87 | 0.46 | 29 | 0.10 |
| 15 | 6 | 12.1 | 67.7 | 69 | 0.53 | 31 | 0.09 |

EXAMPLE 16

The same procedure as in Example 1 was repeated to activate 8.3 g of metallic magnesium. To the activated metallic magnesium were added 140 ml of n-butyl ether and 2 ml of ClMgn-C$_4$H$_9$ solution in n-butyl ether (1.75 mol/liter). To the resulting suspension, which was kept at 60° C., was further added dropwise over 50 minutes a solution containing 38.5 ml of n-butyl chloride dissolved in 50 ml of n-butyl ether. The reactants were stirred at 70° C. for 1.5 hours during reaction. The reaction liquid was kept at 23° C.

Subsequently, to the reaction liquid was added dropwise 55.7 ml of HC(OC$_2$H$_5$)$_3$ over 30 minutes. The reactants were kept at 23° C. for 30 minutes, and then heated to 50° C. over 1 hour. The reactants were kept at 50° C. for 1 hour, and then heated to 80° C. over 1 hour. The reactants were kept at 80° C. for 2 hours, during which reaction proceeded to give a solid reaction product. It was washed with six 300-ml portions of n-hexane at 60° C., followed by drying at room temperature under reduced pressure. Thus there was obtained 38.9 g of magnesium-containing solid.

The thus obtained magnesium-containing solid (6.3 g) was brought into contact with 2,2,2-trichloroethanol in the same manner as in Example 1. The contact product was washed and dried in the same manner as in Example 1. Thus there was obtained 8.7 g of the carrier pertaining to the present invention. This carrier was found to contain 14.5% of magnesium and 47.5% of chlorine and have a specific surface area of 183 m²/g and a pore volume of 0.205 cm³/g. The particle size distribution of the carrier was as shown below.

| Diameter (μm) | Less than 1.9 | 1.9~ 6.4 | 6.4~ 8.2 | 8.2~ 10.5 | 10.5~ 13.6 | 13.6~ 17.7 | 17.7~ 23.7 | 23.7~ 33.7 | 33.7~ 54.9 | Above 54.9 |
| --- | --- | --- | --- | --- | --- | --- | --- | --- | --- | --- |
| Cumulative (%) | 00 | 1.3 | 2.6 | 4.3 | 7.9 | 18.2 | 41.2 | 69.2 | 98.7 | 100 |

The PSDI value of the carrier was 0.47 and the average particle diameter thereof was 27 μm.

EXAMPLE 17

The same procedure as in Example 16 was repeated to react metallic magnesium with n-butyl chloride and HC(OC$_2$H$_5$)$_3$. The reaction liquid was cooled to 25° C. To the reaction liquid was added dropwise 9.8 ml of 2,2,2-trichloroethanol over 30 minutes, with the solid reaction product not separated. The reactants were kept at 80° C. for 1 hour, during which reaction proceeded to give a solid reaction product. It was washed and dried in the same manner as in Example 1. Thus there was obtained 44.1 g of the carrier pertaining to the present invention. This carrier was found to contain 13.9% of magnesium and 44.6% of the chlorine and have a specific surface area of 491 M²/g and a pore volume of 0.580 cm³/g. The particle size distribution of the carrier was as shown below.

| Diameter (μm) | Less than 1.9 | 1.9~ 6.4 | 6.4~ 8.2 | 8.2~ 10.5 | 10.5~ 13.6 | 13.6~ 17.7 | 17.7~ 23.7 | 23.7~ 33.7 | 33.7~ 54.9 | Above 54.9 |
|---|---|---|---|---|---|---|---|---|---|---|
| Cumulative (%) | 0.0 | 0.9 | 2.3 | 5.3 | 13.0 | 27.0 | 39.2 | 65.1 | 92.4 | 100 |

The PSDI value of the carrier was 0.52 and the average particle diameter thereof was 26 μm.

EXAMPLE 18

The same procedure as in Example 17 was repeated with the following exceptions. After the reaction with HC(OC₂H₅)₃, the reaction liquid was cooled to 25° C. and allowed to stand. The supernatant liquid (n-butyl ether) was removed and then 250 ml of n-heptane was added. The reaction product was reacted with 2,2,2-trichloroethanol and the reaction product was washed and dried in the same manner as in Example 17. Thus there was obtained 40.2 g of the carrier pertaining to the present invention. This carrier was found to contain 14.0% of magnesium and 46.2% of chlorine and have a specific surface area of 427 m²/g and a pore volume of 0.520 cm³/g. The particle size distribution of the carrier was as shown below.

| Diameter (μm) | Less than 1.9 | 1.9~ 6.4 | 6.4~ 8.2 | 8.2~ 10.5 | 10.5~ 13.6 | 13.6~ 17.7 | 17.7~ 23.7 | 23.7~ 33.7 | 33.7~ 54.9 | Above 54.9 |
|---|---|---|---|---|---|---|---|---|---|---|
| Cumulative (%) | 0.0 | 0.5 | 1.9 | 4.1 | 11.3 | 26.0 | 37.2 | 74.0 | 98.2 | 100 |

The PSD value of the carrier was 0.50 and the average particle diameter thereof was 25 μm.

COMPARATIVE EXAMPLE 1

A carrier was obtained by following the procedure of Example 1, excepting the contact with 2,2,2-trichloroethanol was omitted. This carrier was found to have a magnesium content of 23.4%, a chlorine content of 34.0%, a specific surface area of 201 m²/g, a PSDI value of 0.38, and an average particle diameter of 17 μm.

COMPARATIVE EXAMPLE 2

A carrier was obtained by following the procedure of Example 1, excepting the contact with 2,2,2-trichloroethanol was omitted. This carrier was found to have a magnesium content of 22.9%. a chlorine content of 34.0% a specific surface area of 215 m²/g, a PSDI value of 0.32, and an average particle diameter of 6 μm.

APPLIED EXAMPLE 1

Preparation of catalyst component

In a reaction vessel provided with a reflux condenser and a stirrer and possessing an inner volume of 300 ml, 6.3 g of the carrier obtained in Example 1 and 40 ml of toluene were placed to form a suspension and the suspension and 60 ml of titanium tetrachloride added thereto were stirred at 120° C. for 2 hours under an atmosphere of nitrogen gas. The solid substance consequently formed therein was separated by filtration and washed seven times each with 100 ml of n-hexane at room temperature, to obtain 5.7 g of a catalyst component having a titanium content of 3.8%.

Polymerization of ethylene

In an autoclave of stainless steel (SUS 32) provided with a stirrer and having an inner volume 1.5 liters, 10.2 mg of the catalyst component obtained as described above, 0.7 mmol of triisobutyl aluminum, and 390 g of isobutane were placed under an atmosphere of nitrogen gas to produce a system for polymerization and the polymerization system was heated to 85° C. Then, hydrogen was introduced therein until the partial pressure of hydrogen reached 20 kg/cm² and ethylene was introduced therein until the partial pressure of ethylene reached 5.0 kg/cm². Ethylene was continuously fed to the autoclave, there to be polymerized for 60 minutes at such a rate as to maintain the total pressure in the system constant. After the polymerization was completed, the contents of the autoclave were purged of the solvent and the unaltered ethylene. The white powdery polymer consequently formed was removed from the autoclave and dried under a vacuum at 70° C. for 10 hours, to obtain 245 g of powdery polyethylene having an MI value of 3.3 g/10 minutes and a bulk density of 0.38 g/cm³[Kc (catalytic activity) 24,000 g of polymer per g of catalyst component]. The average particle diameter of this polyethylene was 750 μm and the PSDI value thereof was 0.33.

APPLIED EXAMPLES 2 THROUGH 20

Preparation of catalyst component and polymerization of ethylene were carried out by following the procedure of Applied Example 1, excepting the carriers obtained in Examples 2 through 18 and Comparative Examples 1 and 2 were used in the place of the carrier obtained in Example 1. The results were as shown below.

| Applied Example | Carrier | Kc (g/g-cat) | MI (g/10 min) | Bulk density (g/cm³) | PSDI |
|---|---|---|---|---|---|
| 2 | Example 2 | 26600 | 4.3 | 0.39 | 0.30 |
| 3 | Example 3 | 22800 | 2.8 | 0.37 | 0.33 |
| 4 | Example 4 | 17300 | 3.3 | 0.37 | 0.40 |
| 5 | Example 5 | 11900 | 3.8 | 0.39 | 0.29 |
| 6 | Example 6 | 14700 | 3.5 | 0.40 | 0.38 |
| 7 | Example 7 | 17500 | 4.1 | 0.37 | 0.33 |
| 8 | Example 8 | 16000 | 2.9 | 0.38 | 0.31 |

-continued

| Applied Example | Carrier | Kc (g/g-cat) | MI (g/10 min) | Bulk density (g/cm$^3$) | PSDI |
|---|---|---|---|---|---|
| 9 | Example 9 | 19000 | 3.1 | 0.35 | 0.35 |
| 10 | Example 10 | 20200 | 3.3 | 0.38 | 0.45 |
| 11 | Example 11 | 18400 | 3.7 | 0.38 | 0.41 |
| 12 | Example 12 | 22500 | 2.9 | 0.38 | 0.49 |
| 13 | Example 13 | 18700 | 3.3 | 0.39 | 0.35 |
| 14 | Example 14 | 26200 | 3.5 | 0.40 | 0.33 |
| 15 | Example 15 | 25300 | 3.8 | 0.40 | 0.33 |
| 16 | Example 16 | 23000 | 3.8 | 0.37 | 0.27 |
| 17 | Example 17 | 21900 | 4.1 | 0.34 | 0.51 |
| 18 | Example 18 | 22900 | 3.7 | 0.37 | 0.50 |
| 19 | Comparative Example 1 | 19900 | 2.1 | 0.20 | 0.69 |
| 20 | Comparative Example 2 | 11600 | 2.1 | 0.39 | 0.31 |

We claim:

1. A magnesium-containing carrier for use in olefin polymerizations obtained by contacting (A) magnesium metal and (B) a halogenated hydrocarbon represented by the general formula, RX wherein R stands for an alkyl, aryl, or cycloalkyl group having 1 to 20 carbon atoms and X stands for a halogen atom, and thereafter contacting the contact product of (A) and (B) with (C) an alkoxy compound of the general formula, $X_n^1M(OR^1)_{m-n}$ wherein $X^1$ stands for a hydrogen atom, a halogen atom, or a hydrocarbon group having 1 to 20 carbon atoms, M stands for a boron, carbon, aluminum, silicon, or a phosphorus atom, $R^1$ stands for a hydrocarbon group having 1 to 20 carbon atoms, and m stands for the valency of said atom M, providing that $m<n\leqq 0$ is satisfied, and contacting the product therefrom with (D) a halogen-containing alcohol.

2. The magnesium-containing carrier in accordance with claim 1 wherein the (A) magnesium metal, (B) halogenated hydrocarbon and (C) alkoxy compound are contacted simultaneously.

3. The magnesium-containing carrier in accordance with claim 1 wherein the halogen-containing alcohol is employed in the range of 0.05 to 20 gram mols per gram mols per gram atom of magnesium in the solid.

4. The magnesium-containing carrier in accordance with claim 1 wherein the surface area of the carrier is less than 1000 $M^2/g$, and the pore volume is less that 1.00 cm$^3$/g.

5. A titanium-containing catalyst component for use in olefin polymerization obtained by contacting a titanium halide with the carrier in accordance with claim 1.

* * * * *